Patented Mar. 10, 1953

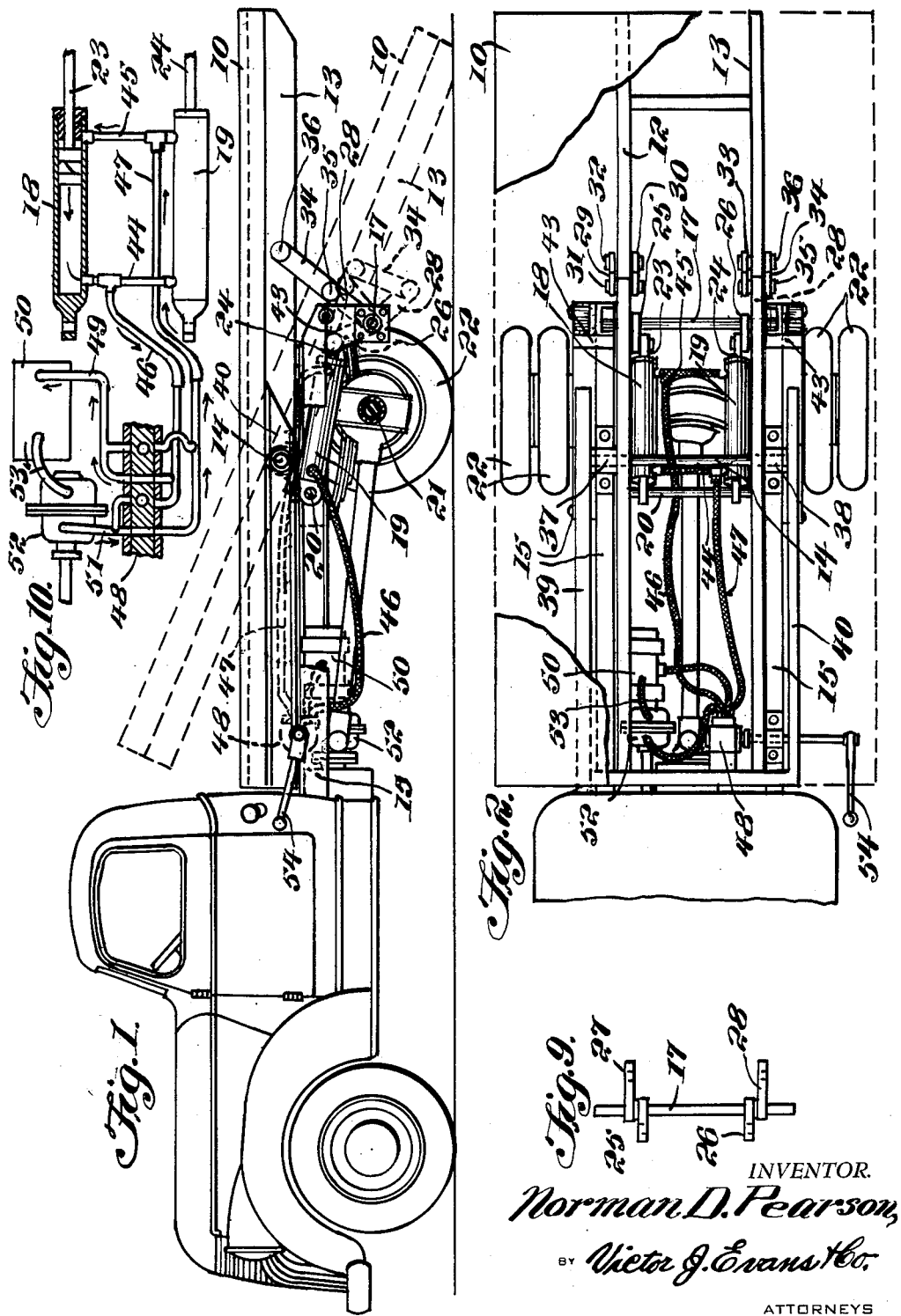

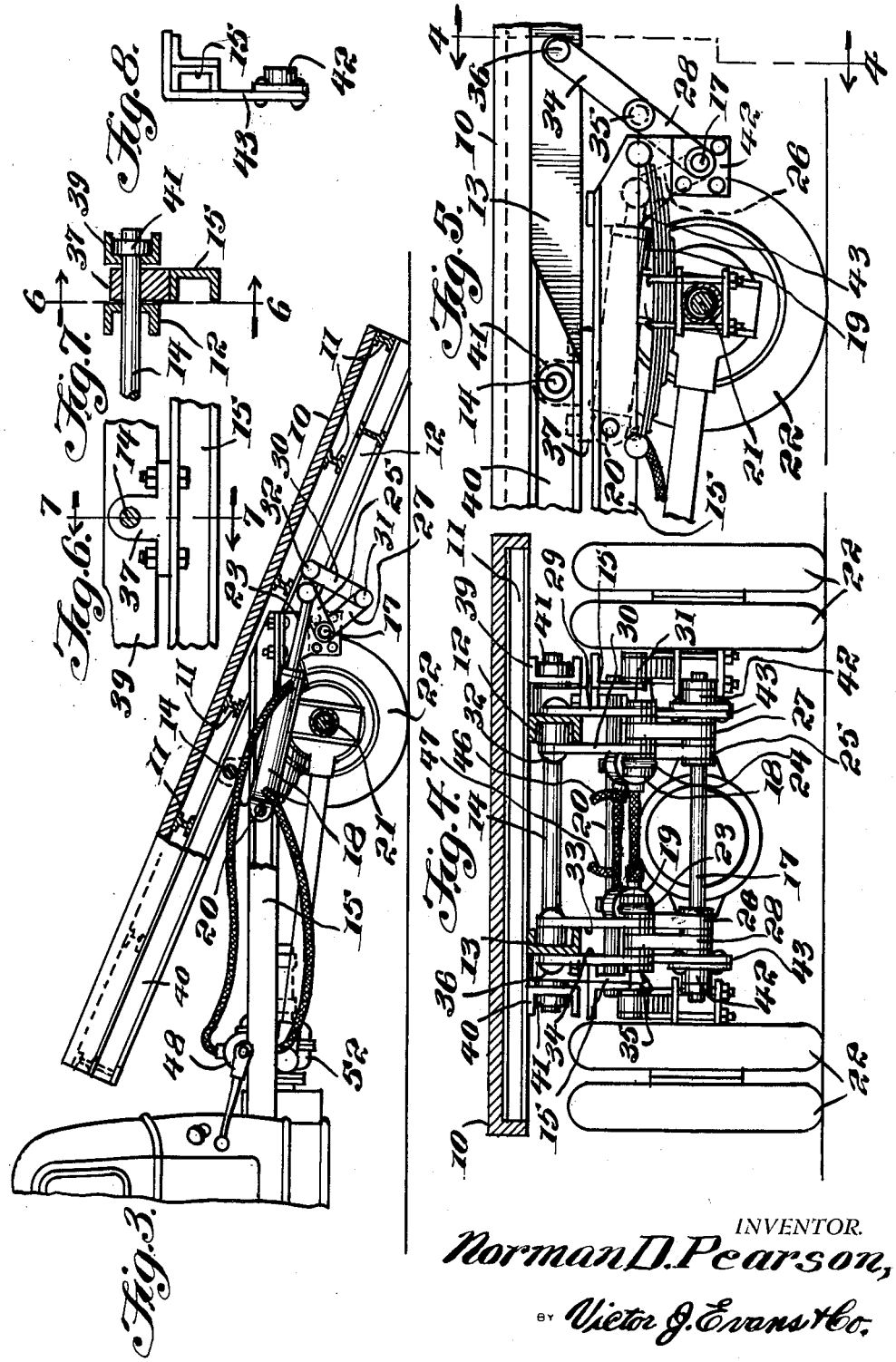

2,630,929

UNITED STATES PATENT OFFICE 2,630,929

HYDRAULIC TRUCK BODY TILTING MECHANISM

Norman D. Pearson, Whittier, Iowa

Application July 18, 1951, Serial No. 237,324

2 Claims. (Cl. 214—85)

This invention relates to motor trucks particularly of the type having elongated platforms or beds and such as used for hauling heavy machinery and equipment, and in particular this invention relates to a truck having a pivotally mounted or tilting body or bed and wherein the mounting and tilting instrumentalities are positioned whereby the trailing end of the bed moves downwardly to the ground or to a surface upon which the truck is positioned.

The purpose of this invention is to arrange tilting elements of a truck bed or body wherein the elements are positioned to drop the trailing end of the bed downwardly for loading and wherein the same elements bring the bed back to a horizontal position and lock the bed in the horizontal position.

Various devices have been provided for tilting bodies and beds of motor trucks, particularly for dumping products from the trucks, however, where trucks are used for hauling tractors and heavy farm equipment it is difficult to drop the rear end of the bed sufficiently to permit driving a vehicle thereon. With this thought in mind this invention contemplates an elongated truck body having a bed pivotally mounted slightly ahead of the rear axle of the truck whereby with hydraulic cylinders pivotally connected to the chassis at a similar point and also connected to toggle acting levers beneath the bed of the truck may be dropped downwardly to a comparatively small angle with the surface upon which the truck is positioned.

The object of this invention is, therefore, to provide means for mounting tilting and elevating elements on a pivotally mounted bed of a truck body whereby the bed is readily tilted to an inclined position and also whereby the bed is returned to a horizontal position.

Another object of the invention is to provide tilting instrumentalities for truck bodies with which a tilting bed may be mounted on the chassis of a truck now in use.

A further object of the invention is to provide a truck having a tilting bed which is of a simple and economical construction.

With these and other objects and advantages in view the invention embodies a motor truck having a chassis mounted on wheels with a bed pivotally mounted on the chassis, with toggle acting levers pivotally mounted on the chassis and connected to the tilting bed and with hydraulic cylinders pivotally mounted on the chassis and connected to the toggle levers whereby the levers are actuated by the cylinders to tilt the bed and also to return the bed to a horizontal position.

Other features and advantages of the invention will appear from the following description taken in connection with the drawings wherein:

Figure 1 is a side elevational view showing a truck having a tilting bed with the bed indicated in the tilted position in dotted lines.

Figure 2 is a plan view of the truck with parts broken away showing the construction and arrangement of the operating instrumentalities.

Figure 3 is a longitudinal section through the rear portion of the truck showing the bed tilted and with part of the bed and truck shown in elevation.

Figure 4 is a cross section through the truck body taken on line 4—4 of Figure 1.

Figure 5 is a side elevational view showing the portion of the truck around the rear axle with the parts shown on an enlarged scale and with the parts in the position shown in Figure 1.

Figure 6 is a detail taken on line 6—6 of Figure 7 showing the pivotal mounting of the bed on the chassis of the truck.

Figure 7 is a cross section through the pivotal mounting of the bed on the truck taken on line 7—7 of Figure 6.

Figure 8 is a detail showing one of the hangers for suspending the bearings for pivotally mounting the toggle levers on the chassis of the truck.

Figure 9 is a plan view showing the arrangement of the toggle levers on the shaft journaled in the bearings suspended from the chassis, as illustrated in Figure 8.

Figure 10 is a diagrammatic view illustrating a method of supplying fluid under pressure to the hydraulic cylinders.

Referring now to the drawings wherein like reference characters denote corresponding parts the improved truck bed tilting mechanism of this invention includes a truck bed having a platform or floor 10 mounted by joists 11 on longitudinally disposed beams 12 and 13, a shaft 14 by which the bed is pivotally mounted on a chassis 15, a rocker shaft 17 with which the toggle levers are mounted on the chassis and hydraulic cylinders 18 and 19 for actuating the bed to inclined and horizontal positions.

In the design shown the hydraulic cylinders 18 and 19 are pivotally mounted on a shaft 20 which is positioned slightly ahead of an axle 21 on which the rear wheels, as indicated by the numeral 22 of the truck are mounted. The shaft 20 which, for the purpose of illustration is located ahead of the rear axle, is positioned in a plane spaced just ahead of and above the rear axle to facilitate downward movement of the cylinders in the tilting operation and the piston rods 23 and 24 which extend from the cylinders are pivotally connected to arms 25 and 26, respectively on the rocker shaft 17.

The rocker shaft 17 is also provided with arms 27 and 28 which, with the arms 25 and 26, are rigidly secured to the shaft, preferably by welding and the extended ends of the arms 27 and 28 are pivotally connected to links pivotally mounted on the beams 12 and 13 of the tilting bed.

As shown in Figure 4, the arm 27 is pivotally connected to links 29 and 30 by a pin 31 and the upper ends of the links are pivotally mounted on the beam 12 by a pin 32. The arm 28 is pivotally connected to links 33 and 34 by a pin 35 and the links are pivotally connected to the beam 13 by a pin 36.

With the parts arranged in this manner fluid under pressure applied to the forward ends of the cylinders 18 and 19 drives the connecting rods outwardly from the position shown in Figure 1 whereby the toggle levers are actuated from the position shown in Figure 1 to that shown in Figure 3 and in this movement the bed 10 is tilted; and when fluid under pressure is applied to the outer ends of the cylinders the piston rods are drawn inwardly with the arms 23 and 24 drawing the arms 25 and 26 upwardly until the pins 31 and 35 pass over the dead center, to the position shown in Figure 1 whereby the bed is locked in a horizontal position.

The shaft 14 by which the bed is pivotally mounted on the chassis is mounted by split bearings 37 and 38 on the side beams of the chassis, as illustrated in Figures 6 and 7, with the ends of the shaft extended through and welded to the beams 12 and 13 and extended into the short beams 39 and 40. The ends of the shaft may be provided with set collars 41, and with bearings 37 and 38 split the shaft is removable from the bearings.

The shaft 17 is journaled in bearings 42 which are suspended from the chassis 15 by hangers 43, as shown in Figure 8.

It will be understood that fluid under pressure may be supplied to the hydraulic cylinders 18 and 19 by suitable means and in the design shown connections 44 and 45 are connected by tubes 46 and 47 to a spool valve 48, one side of which is connected by a tube 49 to a tank or reservoir 50, and the other by a connection 51 to the discharge side of a pump 52. The suction of the pump is connected to the tank 50 by a connection 53.

The valve 48 is operated by a hand lever 54 whereby the fluid under pressure may be applied to either of the ends of the cylinders, as may be desired. It will also be understood that a valve of any other suitable type may be used and the valve may be operated by other suitable means.

It will be understood that modifications may be made in the design and arrangement of the parts without departing from the spirit of the invention.

What is claimed is:

1. A motor truck having a chassis mounted on front and rear wheels, a rear axle through which the chassis is mounted on the rear wheels, a tilting bed positioned on the chassis mounted for pivotal movement about a horizontal axis, means pivotally mounting the said bed on the chassis at a point spaced slightly ahead of the said rear axle, a plurality of hydraulic cylinders having piston rods extended therefrom pivotally mounted on the chassis at a point also spaced slightly ahead of the said rear axle, a rocker shaft suspended from the chassis and positioned at a point at the rear of the said rear axle, pairs of arms carried by said rocker shaft, links pivotally connected at one of the ends thereof to the said tilting bed and positioned with the other of the ends thereof pivotally connected to one of the pairs of arms of the rocker shaft, and means for pivotally connecting the other of said pair of arms of the rocker shaft to the piston rods extended from the hydraulic cylinders, said links and arms positioned whereby with the bed positioned horizontally upon the chassis the connections between the links and arms pass beyond the dead center thereby securing the bed in the horizontal position.

2. A motor truck having a chassis mounted on front and rear wheels, a rear axle through which the chassis is mounted on the rear wheels, a tilting bed positioned on the chassis and mounted for pivotal movement about a horizontal axis, means pivotally mounting the said bed on the chassis at a point spaced slightly ahead of the said rear axle, hydraulic cylinders having piston rods extended therefrom pivotally mounted on the chassis at a point also spaced slightly ahead of the said rear axle, a rocker shaft suspended from the chassis and positioned at a point at the rear of the said rear axle, pairs of arms carried by said rocker shaft, links pivotally connected at one of the ends thereof to the said tilting bed and positioned with the other of the ends thereof pivotally connected to one of the pairs of arms of the rocker shaft, means pivotally connecting the other of the said pair of arms of the rocker shaft to the piston rods extended from the hydraulic cylinders, said links and arms positioned whereby with the bed positioned horizontally upon the chassis the connections between the links and arms pass beyond the dead center thereby securing the bed in the horizontal position, means for supplying fluid to one of the ends of the hydraulic cylinders for tilting the bed, and means supplying fluid to the opposite ends of the cylinders for drawing the bed back to a horizontal position.

NORMAN D. PEARSON.

REFERENCES CITED

The following references are of record in the file of this patent:

UNITED STATES PATENTS

| Number | Name | Date |
|---|---|---|
| 1,705,892 | Ballert | Mar. 19, 1929 |
| 2,146,166 | Anthony et al. | Feb. 7, 1939 |
| 2,220,815 | Feilcke | Nov. 5, 1940 |
| 2,456,805 | Wohlforth | Dec. 21, 1948 |
| 2,470,360 | Messick | May 17, 1949 |